(12) United States Patent
Folks

(10) Patent No.: US 11,801,924 B2
(45) Date of Patent: Oct. 31, 2023

(54) METHODS AND SYSTEMS FOR TRANSMITTING ELECTRIC PULSES FROM THE HULL OF A BOAT TOWARDS A MOTOR

(71) Applicant: Mark Folks, Leander, TX (US)

(72) Inventor: Mark Folks, Leander, TX (US)

(*) Notice: Subject to any disclaimer, the term of this patent is extended or adjusted under 35 U.S.C. 154(b) by 361 days.

(21) Appl. No.: 17/229,139

(22) Filed: Apr. 13, 2021

(65) Prior Publication Data

US 2021/0347451 A1   Nov. 11, 2021

Related U.S. Application Data

(60) Provisional application No. 63/021,362, filed on May 7, 2020.

(51) Int. Cl.
*B63B 79/10* (2020.01)
*B63B 13/02* (2006.01)
*A01M 29/24* (2011.01)

(52) U.S. Cl.
CPC ............ *B63B 79/10* (2020.01); *A01M 29/24* (2013.01); *B63B 13/02* (2013.01)

(58) Field of Classification Search
CPC ......... B63B 13/00; B63B 13/02; B63B 79/00; B63B 79/10; A01M 29/24
USPC ........................................... 114/343
See application file for complete search history.

(56) References Cited

U.S. PATENT DOCUMENTS

| | | | | |
|---|---|---|---|---|
| 5,047,753 A | * | 9/1991 | Birchfield | B63B 13/02 200/61.42 |
| 5,162,793 A | * | 11/1992 | Plost | B63B 13/00 340/568.1 |
| 5,182,556 A | * | 1/1993 | Plost | B63B 13/00 340/568.1 |
| 7,191,722 B1 | * | 3/2007 | Plost | B63B 13/02 114/197 |
| 10,464,640 B1 | * | 11/2019 | Alrujaib | B63B 13/02 |

* cited by examiner

*Primary Examiner* — Lars A Olson
(74) *Attorney, Agent, or Firm* — PIERSON INTELLECTUAL PROPERTY LLC

(57) ABSTRACT

Positioning an electrode through a drain plug on the boat to align transmitted pulses with a water intake of the motor.

14 Claims, 4 Drawing Sheets

METHODS AND SYSTEMS FOR TRANSMITTING ELECTRIC PULSES FROM THE HULL OF A BOAT TOWARDS A MOTOR

BACKGROUND INFORMATION

Field of the Disclosure

Examples of the present disclosure relate to systems for transmitting electric pulses from a fixed structure or from a hull of a boat towards a motor. More specifically, embodiments relate to positioning an electrode through a drain plug on the boat to align transmitted pulses with a water intake of the motor.

Background

Zebra mussels are a highly invasive aquatic nuisance species. Zebra mussels disrupt ecosystems by monotypic colonization, and cause damage to harbors, ships, power plants, etc. Zebra mussels affect water intakes of aquatic devices, and bring free swimming larvae directly into the devices and/or facilities. While in the devices, the zebra mussels cling to pipes, which eventually clogs them.

When the aquatic devices pipes get clogged, devices such as engines may blow, become damaged, etc. The only way to remove the zebra mussels from the aquatic device, is to remove the aquatic device, dissemble the aquatic device, clean the entire aquatic device, and reinsert the cleaned aquatic device. This is an arduous task.

Accordingly, needs exist for more effective and efficient systems and methods to limit zebra mussels from entering intakes of aquatic devices and from fixed structures, such as docks.

SUMMARY

Embodiments disclosed herein describe systems and methods for generating electric pulses, within water, from the hull of a boat directed towards the boat's intake. The electrical pulses may be a high voltage, low current shocks that acts as a deterrent to aquatic nuisance species, such as zebra mussels. Embodiments may include an aquatic mechanical device and an electrode assembly.

The aquatic mechanical device may be any device that is configured to be submerged in water with an intake. For example, the aquatic mechanical device may be an outboard motor or propulsion system that includes an engine, gearbox, propeller, etc. The aquatic mechanical device may be configured to be mounted to a frame of a boat, such that there is a space between the frame of the boat and the aquatic mechanical device. In other embodiments, the aquatic mechanical device may be configured to be coupled to any fixed aquatic structure that is encompassed by water, such as a dock. In embodiments, the aquatic device may include a water intake that is configured to receive water or other fluids from the body of water that the aquatic mechanical device is submerged in. The received fluid may be configured to cool the engine or devices associated with the fixed aquatic structure, provide propulsion, or otherwise be communicatively coupled to other elements of the aquatic mechanical device.

The electrode assembly may include a grounded surface, battery, drain plug receiver, fitting, and electrode.

The grounded surface may be a grounded portion of a boat, such as a grounded motor.

The battery may be an internal power source configured to generate a high voltage, low current electrical pulse.

The drain plug receiver may be a coupling device that is configured to receive a drain plug, wherein the drain plug receiver includes a passageway extending from an exterior surface of the boat's frame to an interior surface of the boat's frame. The drain plug receiver may be configured to receive a drain plug. When the drain plug is positioned within the drain plug receiver, the drain plug may be capped to limit water from flowing into or out of the boat.

The fitting may be a device that is configured to be inserted into the drain plug receiver instead of the drain plug. The fitting may include coupling threads, a projection, and a hollow chamber. The coupling threads may be configured to be coupled with a passageway of the drain plug receiver to couple the fitting with the drain plug receiver. The projection may be an outcrop, extension, etc. of the fitting that is configured to extend away from an exterior surface of the frame of the boat. In embodiments, the projection may be aligned, vertically and horizontally, with the water intake of the aquatic device. In further embodiments, the projection may be angularly aligned to be directed towards the water intake of the aquatic device. The electrode may be a device that is configured to generate and transmit electrical pulses. The electrical pulses may be transmitted from a distal end of the projection, from a positioned outside of the frame of the boat, towards the water intake of the aquatic device. In embodiments, the electrode may be coupled to a battery of the boat. In further embodiments the electrode may be insulated within the fitting with rubber to prevent electricity from pulsing or shorting to the frame of the boat.

Utilizing the transmitted electrical pulses targeted towards the intake of the aquatic device, an invisible electric fence may be created around the motor.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
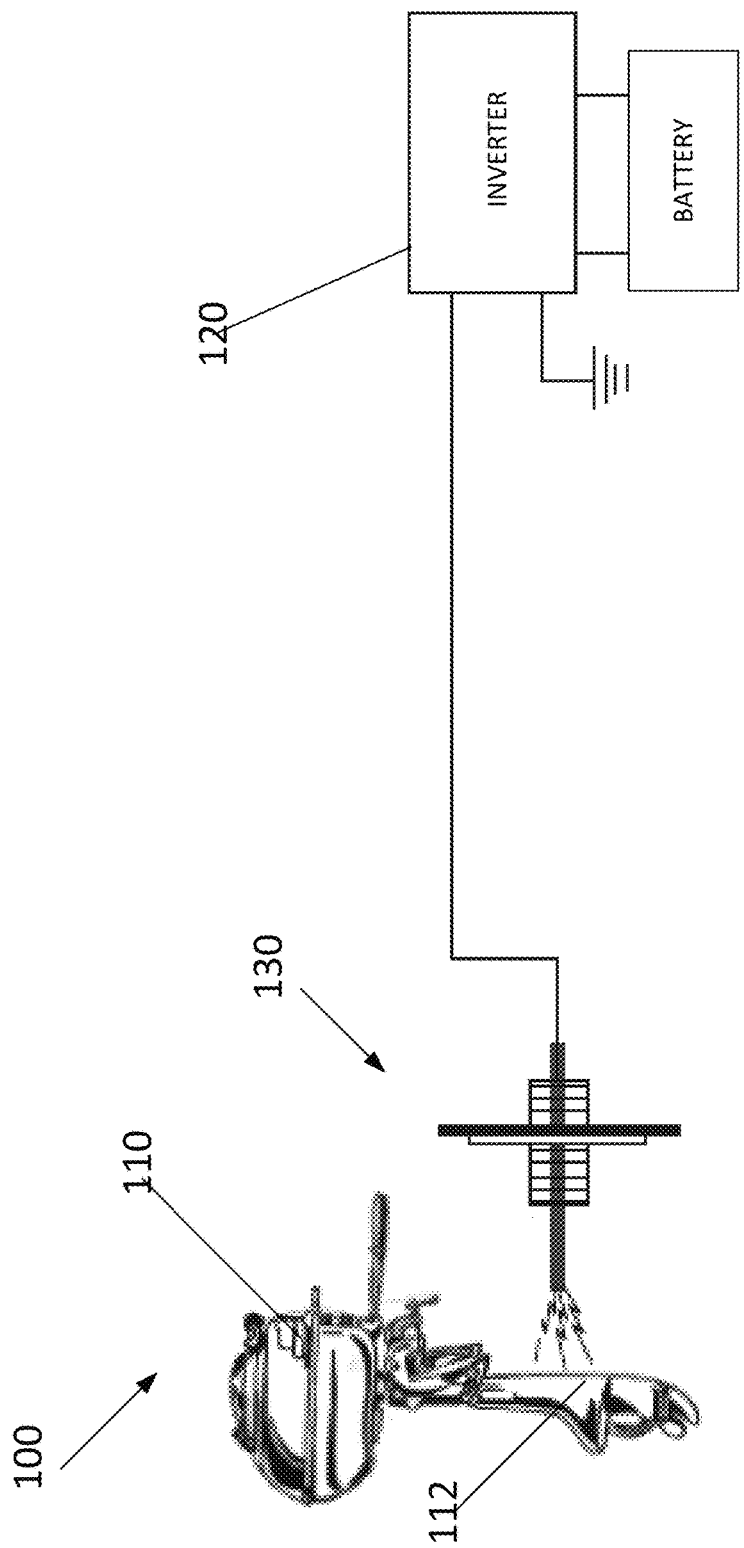
FIG. 1 depicts a submerged electrical system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments disclosed herein describe a system configured to transmit electrical pulses that are targeted towards an intake of an engine's motor, which may create a submerged electrical fence around the motor of the boat. This may limit aquatic species, animals, etc. from interacting with the motor of the boat.

Turning now to FIG. 1, FIG. 1 depicts a submerged electrical system 100, according to an embodiment. System 100 may include a motor 110, power source 120, and electrode assembly 130.

Motor 110 may be any type of aquatic mechanical device that is configured to be submerged in water that utilizes an intake. For example, motor 110 may be an outboard motor or propulsion system that includes an engine, gearbox, propeller, etc. Motor 110 may be configured to be mounted to a frame of a boat, such that there is a space between the frame of the boat and motor 110. In embodiments, motor 110 may include a water intake 112 that is configured to receive water or other fluids from the body of water that motor 110 is submerged in. The received fluid may be configured to cool motor's 110 engine, provide propulsion, or otherwise be communicatively coupled to other elements of motor 110. In further embodiments, motor 110 may be any device that is submerged in water that may be negatively impacted by aquatic animals, organic matter, etc.

Power source 120 may be a battery associated with the boat that is positioned within the boat. Power source 120 may be a DC power source, AC power source, inventor, etc., which is grounded. Power source 120 may be configured to communicate power to electrode assembly 130 to enable electrode assembly to generate electrical pulses.

Electrode assembly 130 may be a device that is configured to receive power from power source 120, and transmit electrical pulses targeted towards a water intake 112 of motor 110. In embodiments, electrode assembly 130 may be aligned with the water intake 112 of motor 130. This may minimize the distance and amount of voltage necessary to deter aquatic animals from entering into the motor, while allowing fluid to flow between electrode assembly 130 and the intake 112 of motor 130.

Figure 2:
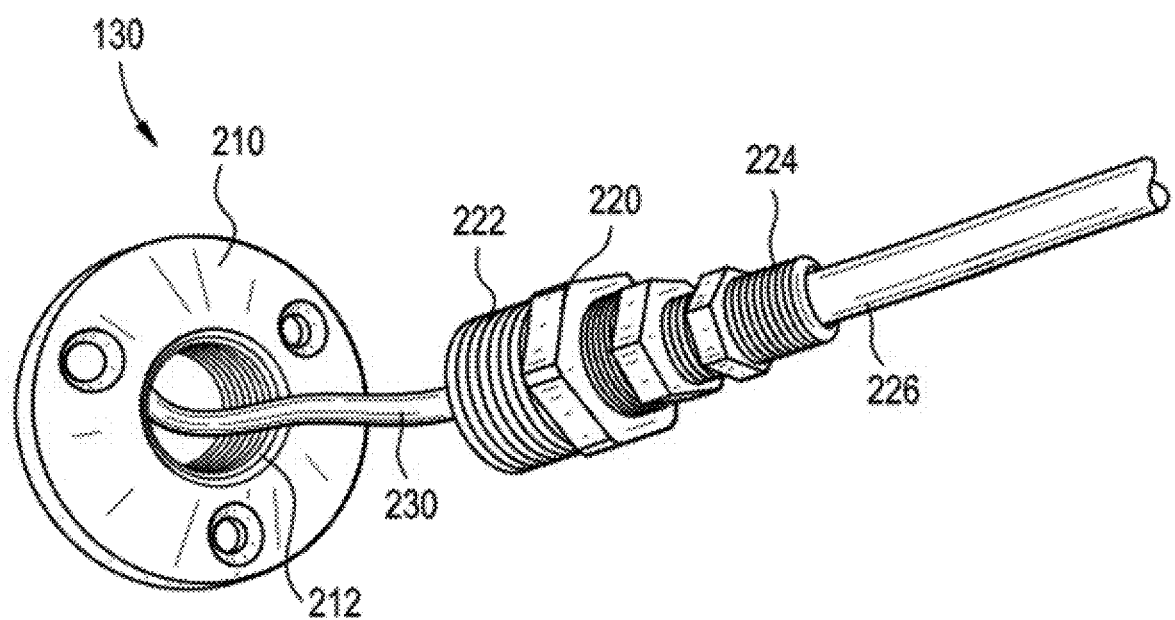
FIGS. 2 and 3 depict detailed views of an electrode assembly, according to an embodiment.
Figure 3:
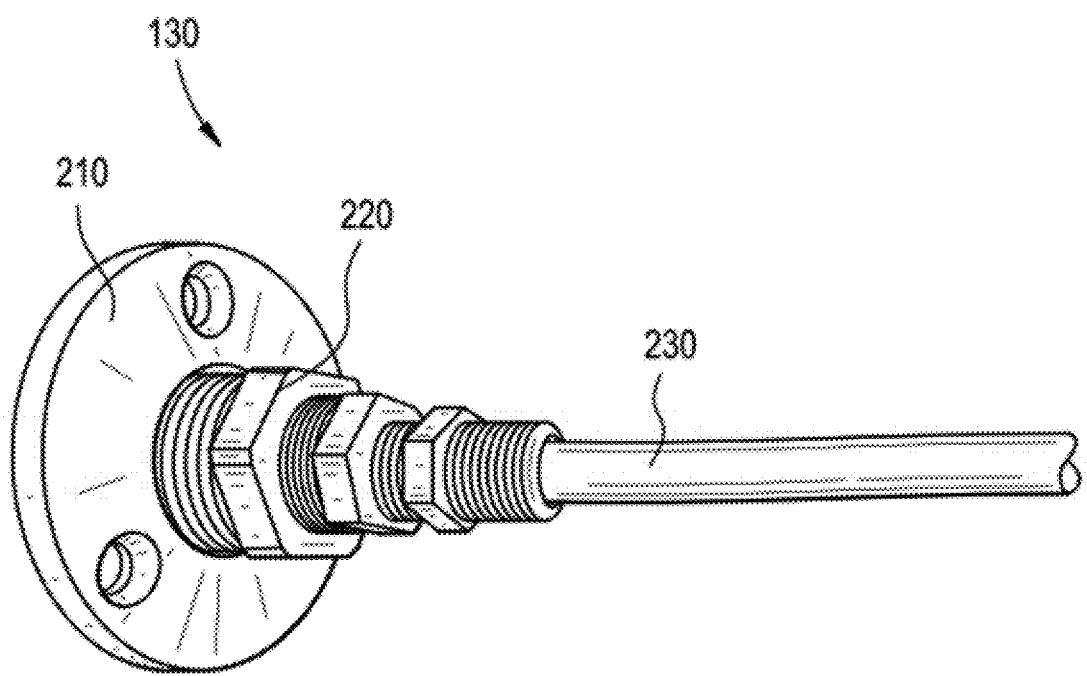

FIGS. 2 and 3 depict detailed views of electrode assembly 130, according to an embodiment.

As depicted in FIGS. 2 and 3 electrode assembly 130 may include a drain plug receiver 210, fitting 230, and electrode 230.

Drain plug receiver 210 may be a coupling device that is configured to receive a drain plug. Drain plug receiver 210 may be configured to be mounted on an external surface of a frame of a boat, and have an internal threaded passageway 212. The internal threaded passageway 212 may be configured to allow fitting 220 to be coupled with drain plug receiver 210, and allow for electrode 220 to extend from a position inside the frame of the boat to a position outside of the frame of the boat.

Fitting 220 may have a threaded proximal end 222, a projection 224 on the distal end of fitting 220, and a hollow passageway 226 extending from proximal end 220 to the distal end of fitting 220. Threaded proximal end 222 may be configured to be inserted into the drain plug receiver 210 instead of a drain plug. This may enable a seal to be formed in an annulus between an outer circumference of proximal end 222 and fitting 220.

Projection 224 may be an outcrop, extension, etc. of fitting 220 that is configured to extend away from an exterior surface of the frame of the boat. This may create a distance from the frame of the boat and a location where the pulses are transmitted. Projection 224 may be aligned, vertically and horizontally, with the water intake of the aquatic device. In further embodiments, projection 224 may be angularly aligned and directed towards the water intake of the motor. The emitted pulses from electrode 230 may be targeted based on the positioning and direction of projection 224. In embodiments, the hollow passageway 226 may be insulated to secure electrode 230 in place, The insulated hollow passageway 226 may enable electrode 230 to pass through fitting, and extend from a position within a hull of the boat to a position outside the hull of the boat while limited the flowing of electrical charges to the boat or surrounding environment.

Electrode 230 may be a device that is configured to generate and transmit electrical pulses. The electrical pulses may be transmitted from a distal end of the projection, from a positioned outside of the frame of the boat, towards the water intake of the aquatic device. In embodiments, electrode 230 may generate a wide variety of electrical pulses with different characteristics, such as amplitude, current, voltage, etc. Electrode 230 may be coupled to a battery of the boat to receive power from the battery of the boat and be grounded via the battery of the boat. In further embodiments, the electrode 230 may be insulated within hollow passageway 226 with rubber to prevent electricity from pulsing or shorting to the frame of the boat. Furthermore, electrode 230 may include an insulated wrap that only allows the distal end of the electrode 230 from emitting pulses at a location that are remote from the boat or aquatic structure.

Utilizing the transmitted electrical pulses targeted towards the intake of the motor, an invisible electric fence may be created around the motor. This may limit the interaction of organic material flowing into or out of the intake of the motor. In further embodiments, the electrical pulses may be targeted towards stationary objects, such as piers, docks, etc., which may also limit the interaction of organic material with the stationary objects. In specific embodiments, this may limit zebra mussels from entering the intake of the motor.

Figure 4:
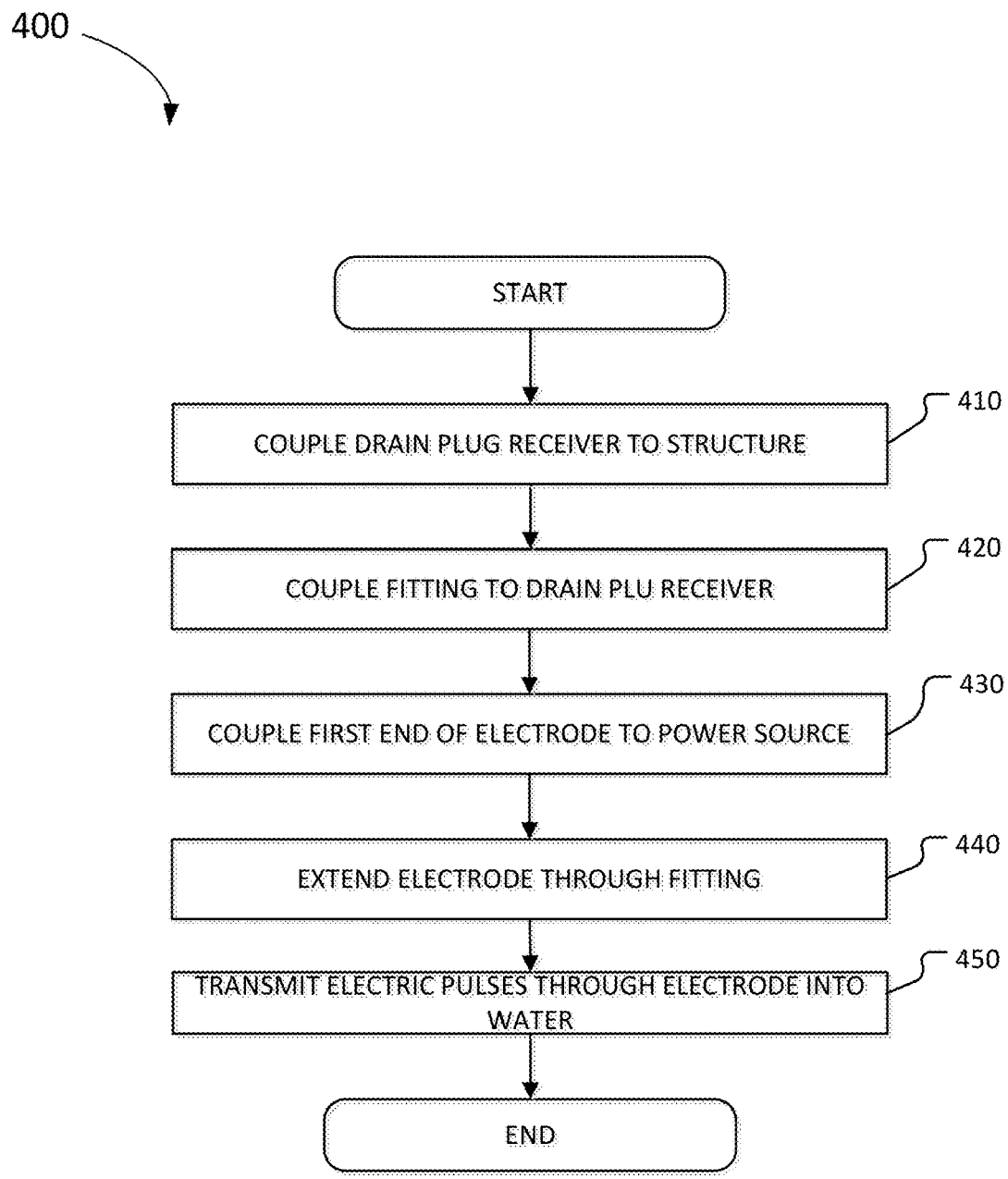
FIG. 4 depicts a method for deterring aquatic life from entering a motor, according to an embodiment.

FIG. 4 depicts a method 400 for deterring aquatic life from entering a motor. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, a drain plug receiver may be mounted on an external surface of an aquatic structure or on a frame of a boat.

At operation 420, a fitting may be coupled to a threaded circumference within the drain plug receiver. The fitting may include a projection that is configured to create a distance between a distal end of the fitting and the frame of the surface.

At operation 430, an electrode may have a first end that is coupled to a battery of a boat to receive power from the battery of the boat and to be grounded via the battery of the boat.

At operation 440, a second end of the electrode may be positioned through a hollow passageway within the fitting and be positioned away from the frame. The second end of the electrode may also be positioned to be aligned with an intake of an aquatic device.

At operation 450, electrical pulses may be emitted from the second end of the electrode, and aimed at the intake of the aquatic device. This may deter aquatic animals from attempting to enter the intake of the aquatic device.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for generating electric pulses within water comprising:
    a drain plug receiver configured to be mounted on an external surface of a boat, the drain plug receiver including a threaded passageway, the threaded passageway extending from the external surface of the boat to an internal surface of the boat;
    a fitting with a hollow passageway, a proximal end, and a distal end, the proximal end of the fitting being configured to be coupled with the threaded passageway of the drain plug receiver;
    an electrode with a first end coupled to a battery of the boat, and a second end submerged in the water, the second end of the electrode configured to emit a pulse of electricity angled towards an intake of a motor of the boat.

2. The system of claim 1, wherein the proximal end of the fitting is configured to be embedded within the drain plug receiver and the distal end of the fitting is configured to be positioned away from the external surface of the boat.

3. The system of claim 1, wherein the second end of the electrode is longitudinally, laterally, and vertically aligned with the intake of the motor of the boat.

4. The system of claim 1, wherein the electrode receives power from battery of the boat and is grounded via the battery of the boat.

5. The system of claim 1, further comprising:
    insulated wrap configured to encompass the electrode.

6. A system for generating electric pulses within water comprising:
    a drain plug receiver configured to be mounted on an external surface of a fixed structure, the drain plug receiver including a threaded passageway, the threaded passageway extending from the external surface of the fixed structure to an internal surface of the boat;
    a fitting with a hollow passageway, a proximal end, and a distal end, the proximal end of the fitting being configured to be coupled with the threaded passageway of the drain plug receiver;
    an electrode with a first end coupled to a battery, and a second end submerged in the water, the second end of the electrode configured to emit a pulse of electricity angled towards an intake of a motor.

7. The system of claim 6, wherein the proximal end of the fitting is configured to be embedded within the drain plug receiver and the distal end of the fitting is configured to be positioned away from the external surface.

8. The system of claim 6, wherein the second end of the electrode is longitudinally, laterally, and vertically aligned with the intake of the motor.

9. The system of claim 6, further comprising:
    insulated wrap configured to encompass the electrode.

10. A method for generating electric pulses within water comprising:
    mounting a drain plug receiver on an external surface of a boat, the drain plug receiver including a threaded passageway, the threaded passageway extending from the external surface of the boat to an internal surface of the boat;
    coupling a proximal end of a fitting with the threaded passageway of the drain plug receiver, the fitting including with a hollow passageway, the proximal end, and a distal end;
    coupling a first end of an electrode to a battery of the boat;
    submerging a second end of the electrode in the water;
    emitting from the second end of the electrode a pulse of electricity angled towards an intake of a motor of the boat.

11. The method of claim 10, further comprising:
    embedding the proximal end of the fitting within the drain plug receiver and the distal end of the fitting is configured to be positioned away from the external surface of the boat.

12. The method of claim 10, wherein the second end of the electrode is longitudinally, laterally, and vertically aligned with the intake of the motor of the boat.

13. The method of claim 10, wherein the electrode receives power from battery of the boat and is grounded via the battery of the boat.

14. The system of claim 1, further comprising:
    encompassing the electrode with insulated wrap.

* * * * *